(12) United States Patent
Nobayashi et al.

(10) Patent No.: US 10,514,248 B2
(45) Date of Patent: Dec. 24, 2019

(54) DISTANCE DETECTING APPARATUS

(71) Applicant: CANON KABUSHIKI KAISHA, Tokyo (JP)

(72) Inventors: Kazuya Nobayashi, Tokyo (JP); Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 757 days.

(21) Appl. No.: 14/417,924

(22) PCT Filed: Jul. 17, 2013

(86) PCT No.: PCT/JP2013/069965
§ 371 (c)(1),
(2) Date: Jan. 28, 2015

(87) PCT Pub. No.: WO2014/021147
PCT Pub. Date: Feb. 6, 2014

(65) Prior Publication Data
US 2015/0176976 A1 Jun. 25, 2015

(30) Foreign Application Priority Data
Jul. 31, 2012 (JP) .................... 2012-169757

(51) Int. Cl.
*G01B 11/12* (2006.01)
*H04N 5/232* (2006.01)
(Continued)

(52) U.S. Cl.
CPC ............... *G01B 11/12* (2013.01); *G02B 7/34* (2013.01); *H04N 5/23212* (2013.01); *H04N 5/3696* (2013.01)

(58) Field of Classification Search
CPC ..................... G01B 11/12; H04N 5/23212
See application file for complete search history.

(56) References Cited

U.S. PATENT DOCUMENTS 5,572,011 A     11/1996  Goto
2008/0258039 A1* 10/2008  Kusaka ................. G02B 7/346
                                                          250/201.8
(Continued)

FOREIGN PATENT DOCUMENTS

JP     2007-121896 A    5/2007
JP     4027113 B2       12/2007
(Continued)

OTHER PUBLICATIONS

Subbarao, M., et al., "Depth Recovery from Blurred Edges", IEEE, Jun. 5, 1988, pp. 498-503, vol. 5.

*Primary Examiner* — William C Vaughn, Jr.
*Assistant Examiner* — Jerry T Jean Baptiste
(74) *Attorney, Agent, or Firm* — Canon USA, Inc., IP Division

(57) ABSTRACT

A distance detecting apparatus includes an imaging unit that generates a first image signal and a second image signal and an arithmetic processing unit. The distance detecting apparatus detects the distance to a subject on the basis of an amount of defocus indicating the distance between an imaging plane of the imaging unit and an image forming plane of light fluxes. The arithmetic processing unit executes a first step of calculating an amount of temporary defocus on the basis of the first image signal and the second image signal, a second step of calculating a conversion factor used to convert an amount of image displacement between a first image and a second image into the amount of defocus on the basis of the amount of temporary defocus, and a third step of calculating the amount of defocus by using the conversion factor.

21 Claims, 14 Drawing Sheets

(51) Int. Cl.
*G02B 7/34* (2006.01)
*H04N 5/369* (2011.01)

(56) References Cited

U.S. PATENT DOCUMENTS

| | | | |
|---|---|---|---|
| 2008/0291311 A1 | 11/2008 | Kusaka | |
| 2010/0045849 A1* | 2/2010 | Yamasaki | G03B 3/10 |
| | | | 348/349 |
| 2010/0079659 A1* | 4/2010 | Ono | H04N 5/23212 |
| | | | 348/345 |

FOREIGN PATENT DOCUMENTS

| | | | |
|---|---|---|---|
| WO | 2010/050386 A1 | | 5/2010 |
| WO | WO 2012/018102 | * | 2/2012 |

* cited by examiner

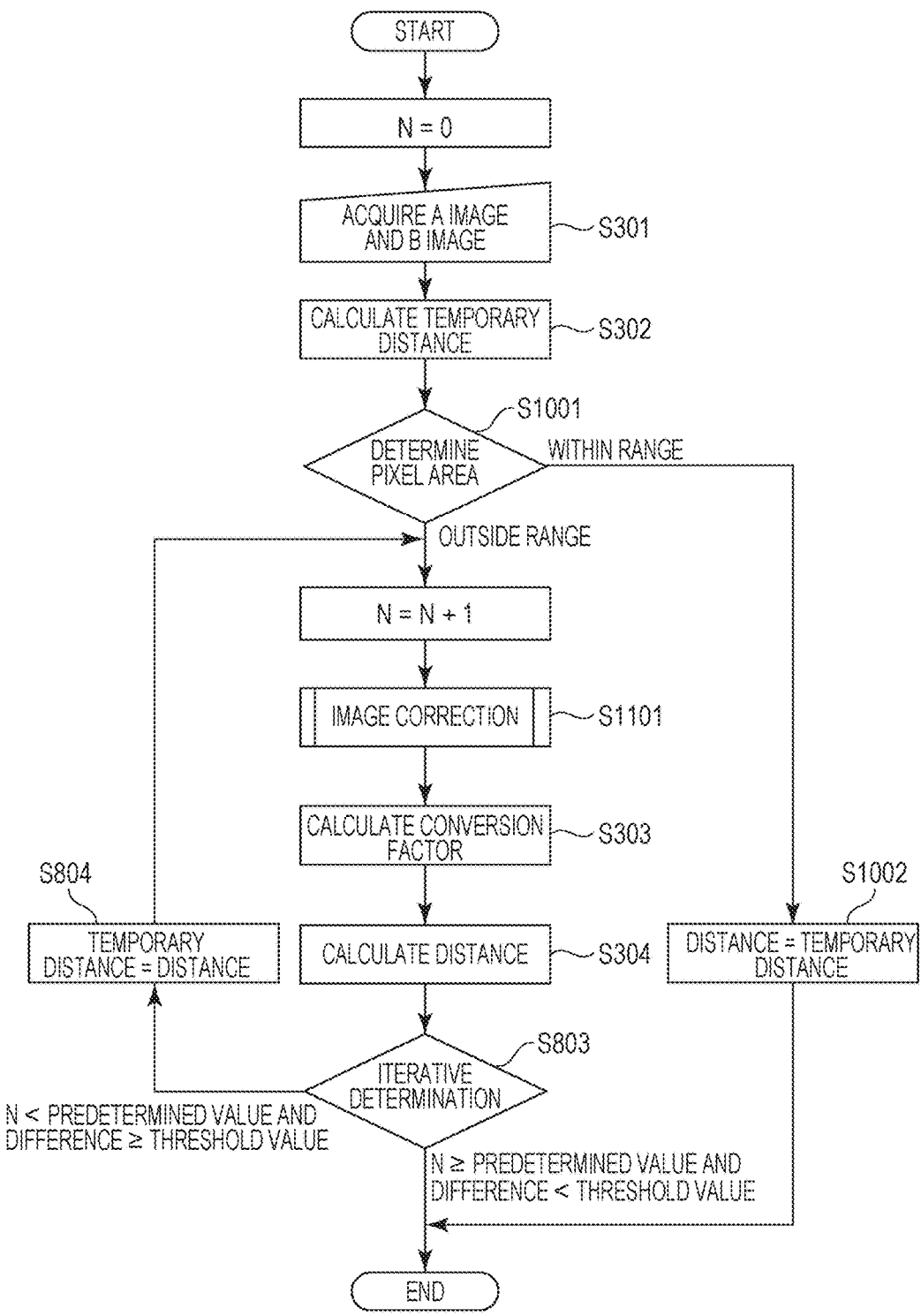

DISTANCE DETECTING APPARATUS

TECHNICAL FIELD

The present invention relates to distance detecting apparatuses. In particular, the present invention relates to a distance detecting apparatus used in an image pickup apparatus, such as a digital still camera or a digital video camera.

BACKGROUND ART

PTL 1 proposes a solid-state image pickup element in which pixels (hereinafter also referred to as distance measurement pixels) having a distance measuring function are arranged in part or all of pixels in the image pickup element to detect the distance to a subject by a phase difference method in a digital still camera or a digital video camera. The distance measurement pixels each include multiple photoelectric converters and are each configured so that light fluxes that have passed through different areas on a pupil of a camera lens are led to different photoelectric converters.

Optical images generated by the light fluxes that have passed through the different pupil areas are acquired from signals acquired in the photoelectric converters included in each distance measurement pixel. Such optical images are hereinafter also referred to as an "A image" and a "B image" and collectively also referred to as "AB images." The amount of displacement between the AB images (hereinafter also referred to as an "amount of image displacement") is detected.

The amount of image displacement is converted into an amount of defocus via a conversion factor to calculate the distance to the subject. With this method, since it is not necessary to move the lens in order to measure the distance, unlike methods using contrast in related art, the distance measurement is enabled at high speed and with high accuracy.

The accuracy of distance in the measurement is improved by acquiring the accurate amount of image displacement and an accurate base line length.

PTL 2 proposes a method of calculating the base line, which is the conversion factor, on the basis of information about the distribution of the light fluxes in an imaging optical system that forms an image of a subject on a solid-state image pickup element and lens aperture information to improve the accuracy of distance.

CITATION LIST

Patent Literature

PTL 1 Japanese Patent No. 4027113
PTL 2 Japanese Patent Laid-Open No. 2007-121896

SUMMARY OF INVENTION

Technical Problem

In the imaging optical system in a typical common digital camera and digital video camera, the conversion factor is varied with the amount of defocus.

Since a constant conversion factor is used regardless of the amount of defocus in the distance detecting apparatus disclosed in PTL 2, the superior accuracy of distance is not constantly maintained and the accuracy of distance can be degraded particularly when the amount of defocus is large.

The present invention provides a distance detecting apparatus that is capable of reducing the error occurring in the conversion of the amount of image displacement into the amount of defocus to calculate the distance with high accuracy and that is preferable to the measurement of the distance to an imaging plane.

Solution to Problem

According to an embodiment of the present invention, a distance detecting apparatus includes an imaging unit configured to generate a first image signal based on a light flux that has passed through a first pupil area of an imaging optical system that forms an image of a subject and a second image signal based on a light flux that has passed through a second pupil area of the imaging optical system; and an arithmetic processing unit. The distance detecting apparatus detects a distance to the subject on the basis of an amount of defocus indicating a distance between an imaging plane of the imaging unit and an image forming plane of the light fluxes that have passed through the imaging optical system. The arithmetic processing unit executes a first step of calculating an amount of temporary defocus on the basis of the first image signal and the second image signal, a second step of calculating a conversion factor with which an amount of image displacement indicating relative positional displacement between a first image and a second image based on the first image signal and the second image signal, respectively, is converted into the amount of defocus on the basis of the amount of temporary defocus, and a third step of calculating the amount of defocus by using the conversion factor.

Advantageous Effects of Invention

According to the present invention, the arithmetic processing unit in the distance detecting apparatus that detects the distance to the subject on the basis of the amount of defocus calculates the amount of temporary defocus, calculates the conversion factor used to convert the amount of image displacement into the accurate amount of defocus on the basis of the amount of temporary defocus, and calculates the amount of defocus by using the conversion factor.

According to the present invention, the calculation of the conversion factor on the basis of the amount of temporary defocus to calculate the amount of defocus by using the calculated conversion factor allows the error occurring in the conversion of the amount of image displacement into the amount of defocus to be reduced to enable the calculation of the distance with high accuracy.

BRIEF DESCRIPTION OF DRAWINGS

FIG. 14 is a flowchart illustrating another example of the process of calculating the distance to the subject.

DESCRIPTION OF EMBODIMENTS

Figure 1A:
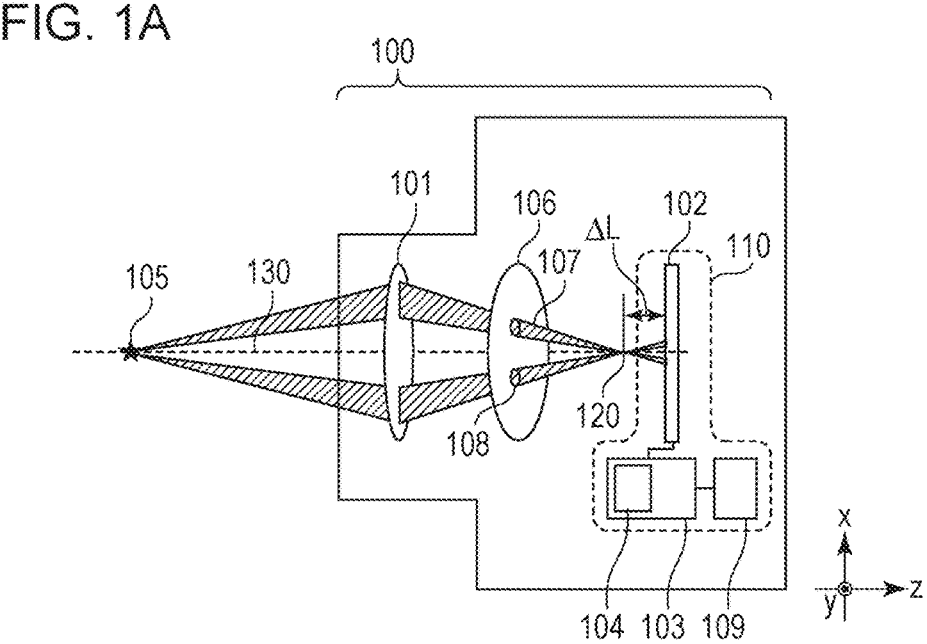
FIG. 1A is a schematic view illustrating an exemplary configuration of an image pickup apparatus including a distance detecting apparatus according to an embodiment.

The present invention is based on a knowledge acquired by the inventor that it is possible to detect the distance to a subject with high accuracy by using an appropriate conversion factor even when the amount of defocus, which has not been hitherto specifically focused on, is varied (particularly, even when the amount of defocus is large).

Exemplary embodiments of the present invention will herein be described with reference to the attached drawings.

Although an image pickup apparatus including a distance detecting apparatus according to an embodiment of the present invention is exemplified by a digital camera in the following description, the present invention is not limitedly applied to the digital camera. For example, the present invention is applicable to an image pickup apparatus, such as a digital video camera or a live view camera, and a digital distance measuring device.

In the light of the application of the present invention to the digital camera, the present invention may be preferred to measurement of the distance to an imaging plane in which distance detection is also performed with an imaging unit that captures an image of a subject, rather than a distance detecting apparatus (used in a single-lens reflex camera, etc.) in which the distance detection is dedicatedly performed separately from the imaging unit.

The same reference numerals are used in different figures to identify the same components in the description with reference to the drawings. A duplicated description of such components is omitted as much as possible.

FIG. 1A is a schematic view illustrating an exemplary configuration of a digital camera such as a digital still camera, which is an example of the image pickup apparatus including the distance detecting apparatus according to the embodiment.

Referring to FIG. 1A, a digital camera 100 includes an imaging lens 101 composing an imaging optical system and a distance detecting apparatus 110 according to the embodiment.

The distance detecting apparatus 110 includes an image pickup element 102 composing an imaging unit, a distance detecting unit 103 including an arithmetic processor 104, and a memory 109.

An image of a subject 105 is formed on the image pickup element 102 through the imaging lens 101. The example in FIG. 1A illustrates a state in which light fluxes that have passed through an exit pupil 106 are focused on an image forming plane 120 to be defocused.

The defocus means a state in which the image forming plane 120 of the lens does not coincide with an imaging plane (a light receiving plane) to displace the image forming plane 120 of the lens along an optical axis 130.

The amount of defocus is represented by ΔL and indicates the distance between the imaging plane of the image pickup element 102 and the image forming plane 120. The distance detecting apparatus according to the embodiment detects the distance between the imaging plane and the subject 105 on the basis of the amount of defocus.

Figure 1B:
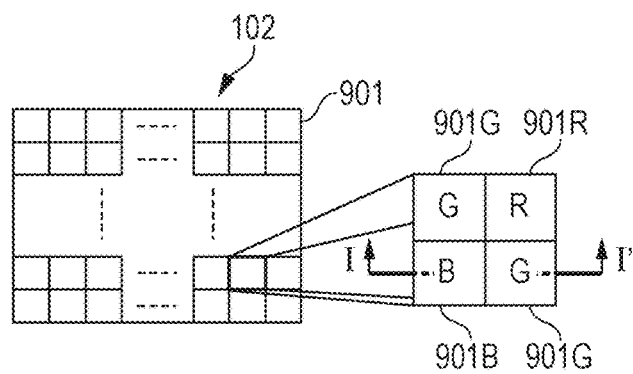
FIG. 1B is a plan view of an image pickup element in FIG. 1A, viewed from the Z direction.

FIG. 1B is a plan view of the image pickup element 102 in FIG. 1A, viewed from the Z direction.

Referring to FIG. 1B, the image pickup element 102 is configured so that distance measurement pixels of two rows and two columns, each of which is represented by reference numeral 901, are arranged in an array form (a matrix form). One distance measurement pixel includes pixels 901G, a pixel 901B, and a pixel 901R.

Figure 1C:
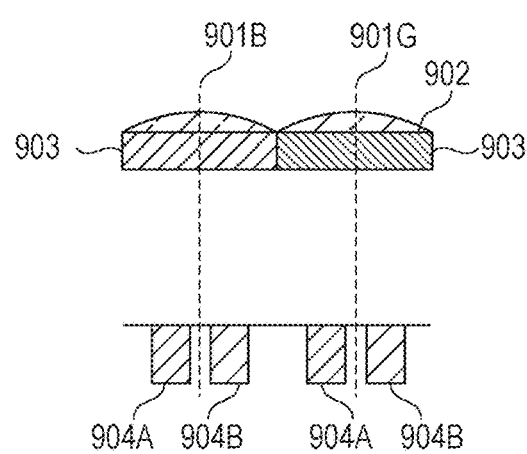
FIG. 1C is a cross-sectional view taken along a line I-I' in FIG. 1B.

FIG. 1C is a cross-sectional view taken along a line I-I' in FIG. 1B.

Referring to FIG. 1C, reference numeral 902 denotes a microlens, reference numeral 903 denotes a color filter, and reference numerals 904A and 904B denote photoelectric converters.

The light fluxes that have passed through different areas (a first pupil area 107 and a second pupil area 108) of the exit pupil 106 are incident on the photoelectric converter 904A (a first photoelectric converter) and the photoelectric converter 904B (a second photoelectric converter) to generate a first image signal and a second image signal, respectively.

An image based on the first image signal is the "A image" and an image based on the second image signal is the "B image." In accordance with this, the photoelectric converter 904A is called an "A pixel (a first pixel)" and the photoelectric converter 904B is called a "B pixel (a second pixel)". A pair of the first pixel and the second pixel composes one distance measurement pixel.

In the embodiments of the present invention, for example, a solid-state image pickup element, such as a Complementary Metal Oxide Semiconductor sensor (CMOS sensor) or a Charge Coupled Device sensor (CCD sensor), may be used as the image pickup element.

The digital camera (the image pickup apparatus) 100 including the distance detecting apparatus according to the embodiment of the present invention may be configured so that the distance measurement pixels (904A and 904B) and pixels (hereinafter also referred to as "image acquisition pixels") composed of the photoelectric converters that perform the imaging to acquire an image of the subject to be imaged are arranged on the same face (for example, the same plane).

In this case, the arrangement mode is appropriately selected in consideration of the function of the image pickup apparatus. For example, a mode in which the distance measurement pixels and the image acquisition pixels are alternately arranged (a checkered pattern) or a mode in which some columns of the image acquisition pixels arranged in an array form is discretely replaced with the distance measurement pixels may be adopted.

Alternatively, the distance measurement pixels themselves may be used as the image acquisition pixels.

The present invention is characterized in that the arithmetic processor 104 performs temporary distance calculation to calculate an amount of temporary defocus on the basis of the first image signal and the second image signal.

The present invention is also characterized in that the arithmetic processor 104 performs conversion factor calculation to calculate the conversion factor with which the amount of image displacement, which indicates relative positional displacement between a first image and a second image based on the first image signal and the second image signal, respectively, is converted into the amount of defocus on the basis of the amount of temporary defocus.

The present invention is further characterized in that the arithmetic processor 104 performs distance calculation to calculate the amount of defocus by using the conversion factor.

[Basic Distance Detecting Method According to an Embodiment of the Present Invention]

Figure 3:
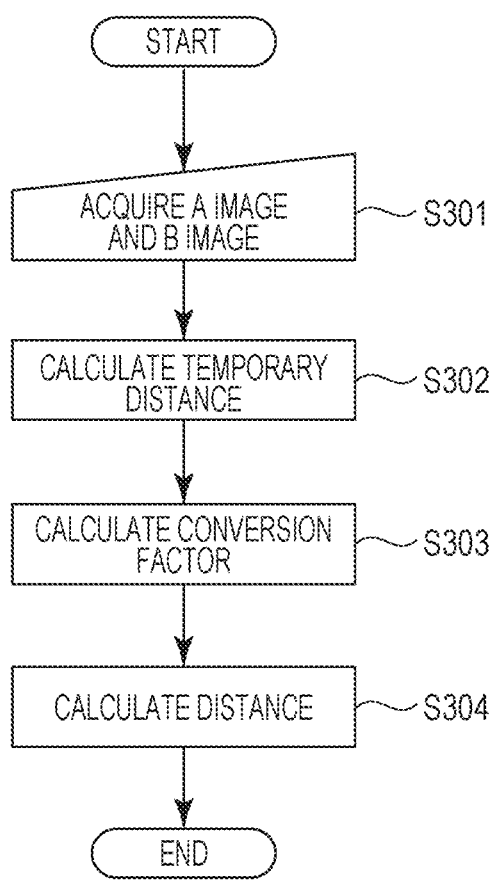
FIG. 3 is a flowchart illustrating an example of a process of calculating the distance to a subject.

FIG. 3 is a flowchart illustrating an example of a process of calculating the distance to the subject according to an embodiment of the present invention in consideration of the arithmetic processing in the arithmetic processor 104.

Calculation of distance information about the subject will now be described with reference to the flowchart in FIG. 3.

Referring to FIG. 3, in Step S301, the image signals corresponding to the A image and the B image of the subject are acquired on the basis of the light fluxes that have passed through different pupil areas between the A pixel (for example, the photoelectric converter 904A in FIG. 1C) and the B pixel (for example, the photoelectric converter 904B in FIG. 1C). The image signals are supplied to the arithmetic processor 104 in the distance detecting unit 103.

In the temporary distance calculation in Step S302, the amount of temporary defocus is calculated. First, correlation calculation of the A image and the B image is performed to calculate an amount of image displacement r, which indicates the amount of relative positional displacement between the A image and the B image. The correlation calculation may be performed by a known method. For example, a correlation value S(k) is calculated by using image signal data A(i) about the A image and image signal data B(i) about the B image according to Equation (1):

[Math. 1]

$$S(k) = \sum_{i=p}^{q} |A(i+k) - B(i)| \quad (1)$$

In Equation (1), S(k) denotes the correlation value indicating the degree of correlation between the A image and the B image with an amount of shift k, i denotes a pixel number, and k denotes the relative amount of shift between the A image and the B image. In the calculation of the correlation value S(k) with the amount of shift k being varied, the correlation value S(k) indicates the minimal value at the amount of shift at which the A image has a high degree of correlation with the B image. The amount of shift k providing the minimal value of the correlation value S(k) is calculated and the amount of shift k is multiplied by the size of the cycle of the pixels, which indicates data sampling interval of the image signals of the A image and the B image, to calculate the amount of image displacement r between the A image and the B image. In Equation (1), p and q denote target pixel ranges used in the calculation of the correlation value S(k). The amount of image displacement r that is calculated is corresponds to r in FIG. 4C.

Next, a temporary base line length w1, which is a temporary conversion factor, is calculated. The base line length means the length between the centroid positions of the sensitivities of the two pixels: the A pixel and the B pixel projected on the exit pupil 106. In other words, the calculation of the temporary base line length w1 is affected by the sensitivities of the distance measurement pixels.

Figure 2:
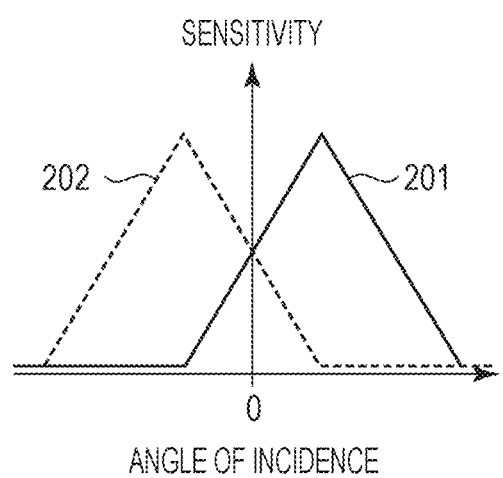
FIG. 2 is a schematic view illustrating the sensitivities of distance measurement pixels.

FIG. 2 is a schematic view illustrating the sensitivities of the distance measurement pixels. The horizontal axis represents the angle of incidence between a light beam and the optical axis (the optical axis 130 in FIG. 1A) and the vertical axis represents the sensitivity. Referring to FIG. 2, a solid line 201 illustrates the sensitivity of the A pixel that mainly receives the light flux from the first pupil area 107 and a broken line 202 illustrates the sensitivity of the B pixel that mainly receives the light flux from the second pupil area 108.

Figure 4A:
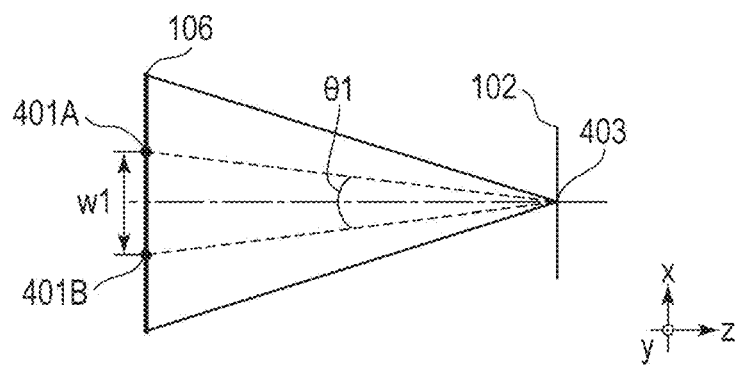
FIG. 4A is a schematic view for describing a process of calculating a temporary distance, which schematically illustrates only an exit pupil and the image pickup element in the image pickup apparatus in FIG. 1A.

FIG. 4A schematically illustrates only the exit pupil 106 and the image pickup element 102 in the digital camera 100 in FIG. 1A. Referring to FIG. 4A, as apparent from the fact that the light fluxes that have passed through the exit pupil 106 form images on the imaging plane of the image pickup element 102, the base line length in a state in which the amount of defocus is zero (no defocus) is the temporary base line length w1 in the calculation of the temporary base line length w1. Although a base line length w depends on the amount of defocus, the temporary base line length w1 is the base line length in the state in which the amount of defocus is zero. The pixel sensitivities illustrated in FIG. 2 are projected on the exit pupil 106 from the center of the distance measurement range (reference numeral 403 in FIG. 4A) in the image pickup element 102 to acquire information about the distributions of pupil sensitivities illustrated in FIG. 4B.

Figure 4B:
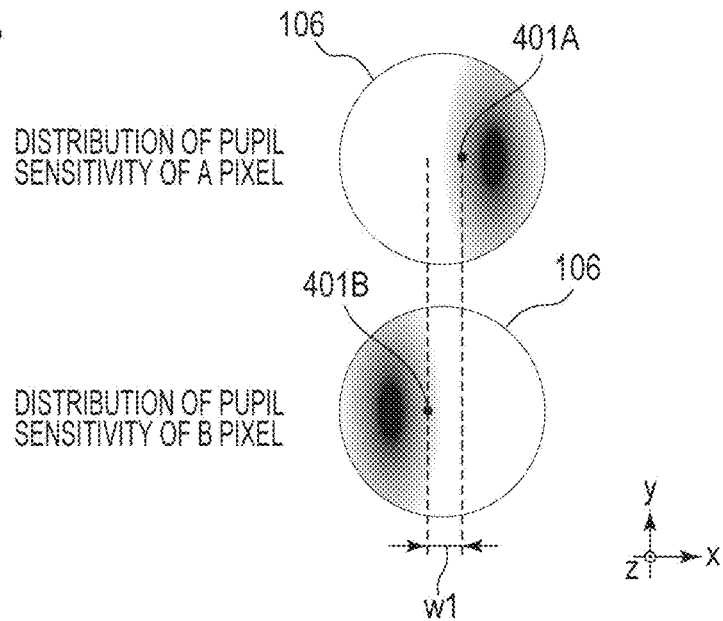
FIG. 4B is a schematic view for describing the process of calculating the temporary distance, which illustrates the distributions of pupil sensitivities of an A pixel and a B pixel.

FIG. 4B illustrates the distributions of the pupil sensitivities of the A pixel and the B pixel. The darker the color the higher the sensitivity in FIG. 4B. In FIG. 4B, reference numeral 106 denotes the frame of the exit pupil and corresponds to the exit pupil 106 in FIG. 1A. A centroid position 401A of the sensitivity of the A pixel and a centroid position 401B of the sensitivity of the B pixel on the pupil are calculated from the distributions of the pupil sensitivities. The length between the centroid position 401A and the centroid position 401B is the temporary base line length w1.

After the amount of image displacement r and the temporary base line length w1 are calculated, the amount of image displacement r is converted into an amount of temporary defocus ΔL1 at the image side according to Equation (2) for conversion:

[Math. 2]

$$\Delta L1 = \frac{rL}{w1 - r} \quad (2)$$

Figure 4C:
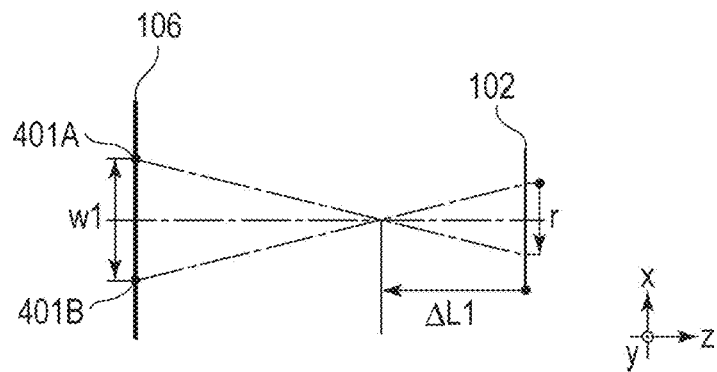
FIG. 4C is a schematic view for describing the process of calculating the temporary distance, which illustrates the relationship among a temporary base line length, an amount of image displacement, the distance between the image pickup element and the exit pupil, and an amount of temporary defocus.

In Equation (2), L denotes the distance between the image pickup element (the imaging plane) 102 and the exit pupil 106. FIG. 4C illustrates the relationship among the temporary base line length w1, the amount of image displacement r, the distance L between the image pickup element 102 and the exit pupil 106, and the amount of temporary defocus ΔL1, which are calculated in the above manner.

The image forming plane of the light fluxes that have passed through the imaging lens 101 is shifted from the plane (a distance measurement reference plane) on which the amount of image displacement between the A image and the B image is zero due to wave front aberration of the imaging lens 101.

Accordingly, it is preferable to correct the amount of positional displacement between the image forming plane and the distance measurement reference plane in Equation (2).

In the present embodiment, the amount of defocus in the −z direction with respect to the image pickup element 102 is negative and the amount of image displacement when the A image is displaced with respect to the B image in the −x direction is negative, as illustrated in FIG. 4C.

In the conversion factor calculation in Step S303, the amount of temporary defocus ΔL1 calculated in Step S302 is used to calculate a base line length w2, which is a more accurate conversion factor.

Figure 5A:
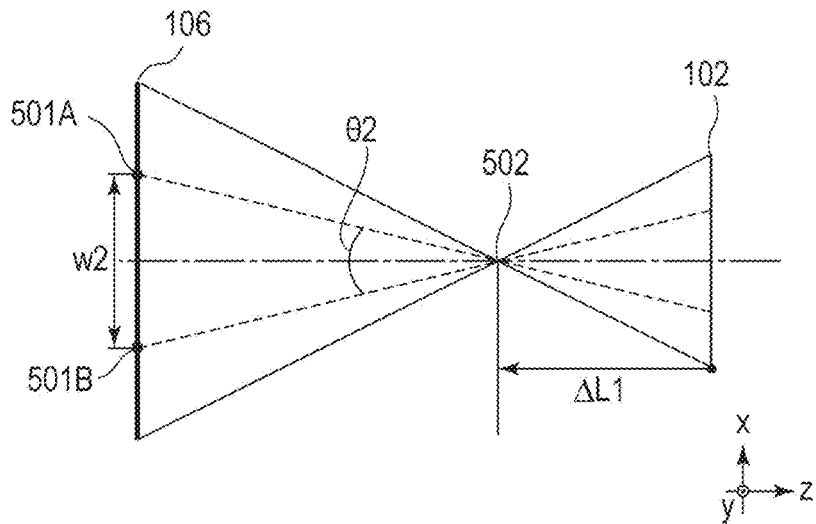
FIG. 5A is a schematic view for describing an example of a process of calculating a conversion factor, which schematically illustrates the exit pupil and the image pickup element.

FIG. 5A schematically illustrates the exit pupil 106 and the image pickup element 102, as in FIG. 4A.

The amount of temporary defocus ΔL1 calculated in Step S302 is used to calculate a focus position (an image formation point) 502 in Step S303. In addition, the pixel sensitivities illustrated in FIG. 2 are projected on the exit pupil 106 from the focus position (the image formation point) 502 to acquire the distributions of the pupil sensitivities corresponding to the A pixel and the B pixel illustrated in FIG. 5B.

Figure 5B:
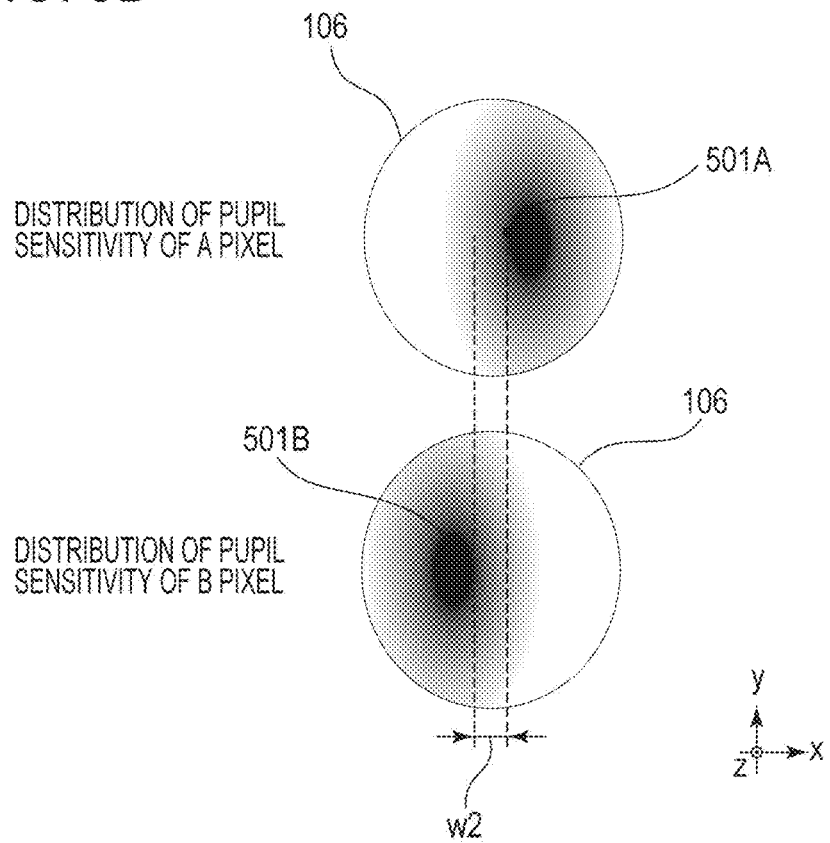
FIG. 5B is a schematic view for describing the example of the process of calculating the conversion factor, which illustrates the distributions of the pupil sensitivities of the A pixel and the B pixel.

A centroid position 501A and a centroid position 501B are calculated from the distributions of the pupil sensitivities in FIG. 5B to calculate the base line length w2.

In the distance calculation in Step S304, the temporary base line length w1 in Equation (2) is replaced with the base line length w2 calculated in Step S303 to calculate an amount of defocus ΔL2.

It is possible to calculate the more accurate distance to the subject by using the amount of defocus ΔL2 calculated in Step S304, the distance to the focus of the imaging lens, and the position of the principal point of the imaging lens (the position of the imaging lens).

In the present embodiment, the execution from Step S301 to Step S304 allows the base line length w2 the accuracy of which is higher than that of the temporary base line length w1 to be calculated to reduce the error in the conversion from the amount of image displacement into the amount of defocus, thereby calculating the distance with high accuracy.

Although the method of calculating the base line length as the conversion factor is described above, a centroid angle may be used as the conversion factor.

The centroid angle used as the conversion factor is calculated in the following manner.

In Step S302 in FIG. 3, a temporary centroid angle θ1 formed by the centroid position 401A, the center 403 of the distance measurement range, and the centroid position 401B is calculated, instead of the temporary base line length w1, in FIG. 4A. In Step S303, a centroid angle θ2 formed by the centroid position 501A, the focus position 502, and the centroid position 501B is calculated, instead of the base line length w2. Calculating the height of a triangle in which the amount of image displacement r is the base and the temporary centroid angle θ1 or the centroid angle θ2 is the apex angle allows the amount of image displacement to be converted into the amount of defocus.

The conversion factor is not limited to the base line length and the centroid angle and may be a function with which the base line length or the centroid angle can be approximately derived. For example, the approximation with a quadratic function using the amount of defocus as a variable may be performed, the coefficient of the quadratic function may be stored in the memory 109, and the coefficient may be appropriately read out to calculate the base line length. For example, the amount of temporary defocus may be substituted into a function using the amount of defocus as a variable to calculate the conversion factor.

The approximation with a function allows the amount of calculation in the calculation of the base line length on the basis of the amount of temporary defocus in Step S303 to be reduced to enable the detection of the distance to the subject at higher speed.

Another embodiment of the conversion factor calculation will now be described.

In Step S302 and Step S303 in the present embodiment, vignetting of the imaging lens 101 is preferably considered in the calculation of the centroid positions.

The consideration of the vignetting allows the conversion factor to be more accurately calculated to enable the calculation of the distance with high accuracy.

The base line length w2, which is the conversion factor, is calculated after the distributions of the pupil sensitivities of the A pixel and the B pixel are acquired in the above description in Step S303. However, information (the distance, the F-number, and the vignetting) about the exit pupil of the imaging lens 101 and conversion factor information corresponding to the amount of temporary defocus ΔL1 may be stored in the memory 109 in advance and the information may be appropriately read out for usage.

The storage of the conversion factor information in the memory 109 in advance allows the amount of calculation to be reduced to enable the detection of the distance to the subject at higher speed.

Line spread functions may be used to calculate the centroid positions 501A and 501B used in the calculation of the conversion factor.

A method of using the line spread functions will now be described, taking a case in which the base line length is used as the conversion factor as an example.

Figure 6A:
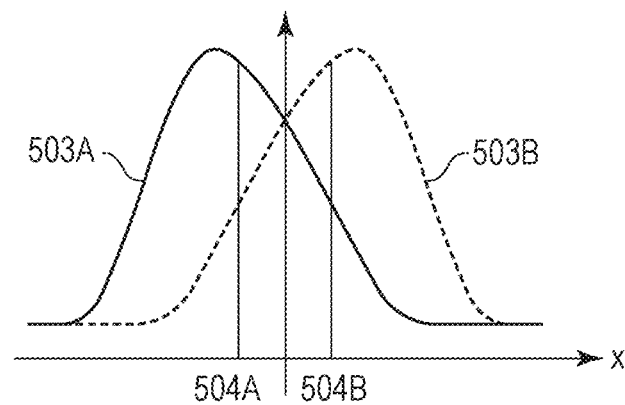
FIG. 6A is a schematic view for describing another example of the process of calculating the conversion factor, which illustrates a line spread function of an A pixel and a line spread function of a B pixel with defocusing by the amount of temporary defocus.

FIG. 6A illustrates a line spread function (a first line spread function) 503A of the A pixel and a line spread function (a second line spread function) 503B of the B pixel with defocusing by the amount of temporary defocus ΔL.

First, a centroid position 504A is calculated for the line spread function 503A. Similarly, a centroid position 504B is calculated for the line spread function 503B.

Figure 6B:
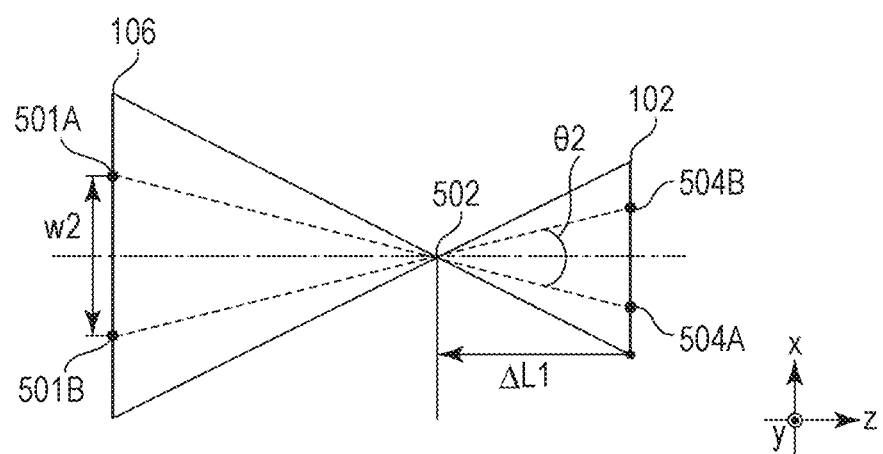
FIG. 6B is a schematic view for describing the other example of the process of calculating the conversion factor.

Next, as illustrated in FIG. 6B, a point of intersection of a straight line connecting the centroid position 504A (504B) of the line spread function with the focus position 502 calculated in Step S303 described above and the exit pupil is set as the centroid position 501A (501B) of the sensitivity of the A pixel (the B pixel) on the pupil.

Next, the length between the centroid position 501A and the centroid position 501B is set as the base line length w2.

The use of the line spread function allows the base line length based on the effect of the aberration of the imaging lens 101 and the effect of diffraction spreading to be calculated to enable the calculation of the distance with higher accuracy.

In the use of the centroid angle as the conversion factor, an angle formed by the centroid position 504A, the focus position 502, and the centroid position 504B is used as the centroid angle θ2.

Figure 9:
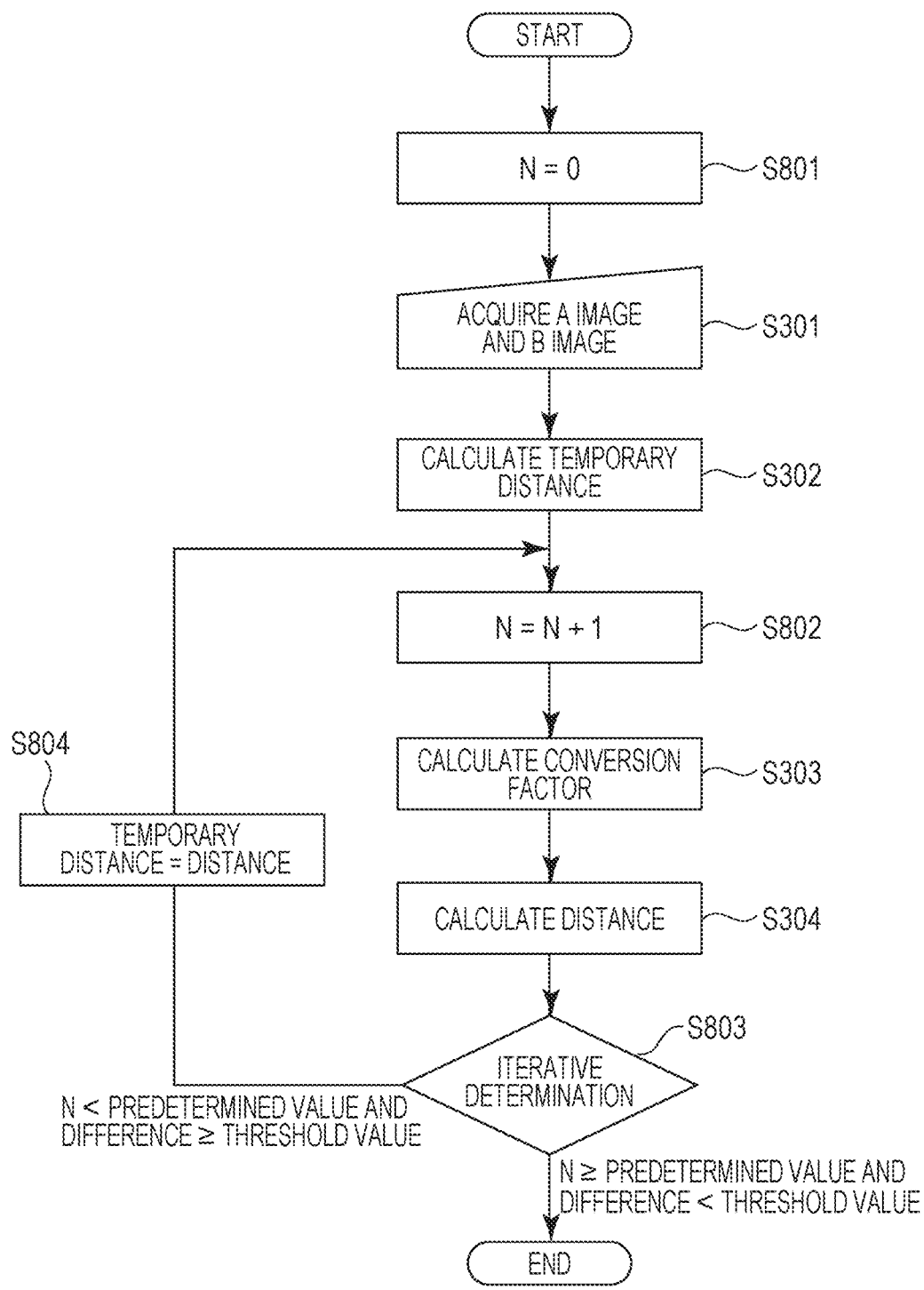
FIG. 9 is a flowchart illustrating another example of the process of calculating the distance to the subject.

FIG. 9 is a flowchart illustrating an example of the process of calculating the distance to the subject with much higher accuracy.

Referring to FIG. 9, N denotes the number of times when the conversion factor is calculated. In iterative determination in Step S803, the process goes to Step S804 if the number of times N when the conversion factor is calculated is smaller than a predetermined value and the difference between the amount of defocus calculated in Step S304 and the amount of temporary defocus is larger than or equal to a predetermined threshold value. The process is otherwise terminated.

In Step S804, the amount of defocus calculated in Step S304 is set as the amount of temporary defocus. Then, Step S303 and Step S304 are repeated.

With the above process, performing Step S303 and Step S304 multiple times allows the accuracy of the conversion factor that is calculated to be further improved to enable the calculation of the distance with much hither accuracy.

[Reason for Detection of Distance with High Accuracy]

The reason why the calculation of the distance with high accuracy is enabled with the distance detecting apparatus of the present embodiment will now be described with reference to FIGS. 7A and 7B, etc., taking the case in which the base line length is used as the conversion factor as an example.

Figure 7A:
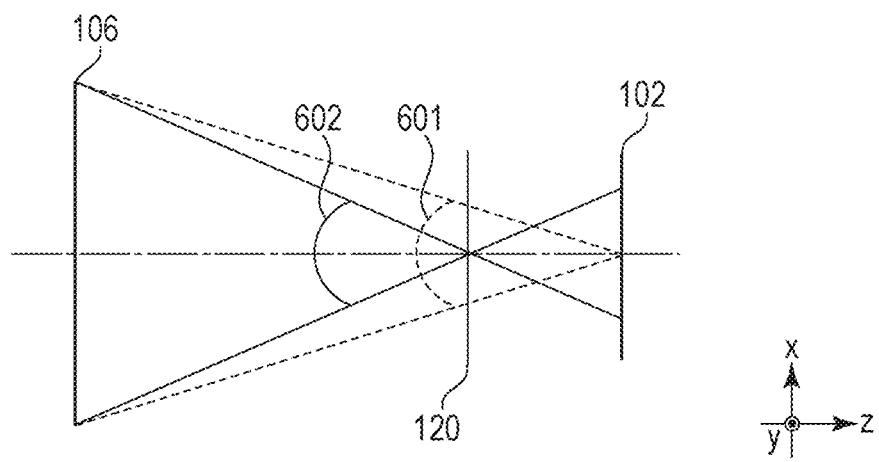
FIG. 7A is a diagram for describing the advantage of the embodiment of the present invention, which schematically illustrates the relationship between the exit pupil and the image pickup element in the image pickup apparatus in FIG. 1A.

FIG. 7A schematically illustrates the relationship between the exit pupil 106 and the image pickup element 102 in the digital camera 100 illustrated in FIG. 1A.

The temporary base line length calculated in Step S302 in FIG. 3 is calculated on the assumption that the light flux in a range indicated by a broken line 601 in FIG. 7A is incident on the image pickup element 102.

However, since the focus position is defocused to the image forming plane 120, the light flux indicated by a solid line 602 is incident on the image pickup element 102.

Accordingly, the range of the angle of incidence of the light flux 601 is different from the range of the angle of incidence of the light flux 602 and, thus, the centroid positions 401A and 401B in FIG. 4A calculated on the basis of the light flux 601 have values different from those of the centroid positions calculated on the basis of the light flux 602.

Figure 7B:
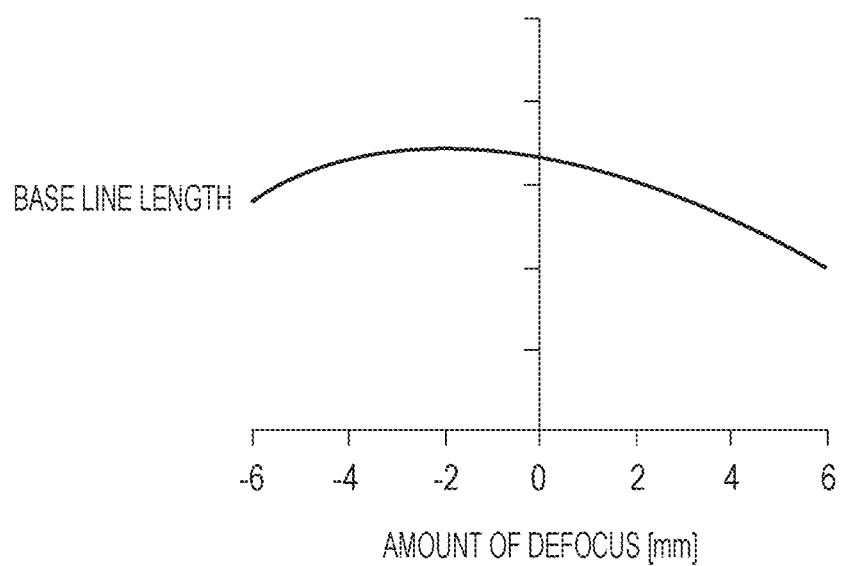
FIG. 7B is a diagram for describing the advantage of the embodiment of the present invention, which is a graph illustrating the dependency of a base line length on an amount of defocus.

FIG. 7B is a graph illustrating the dependency of the base line length on the amount of defocus. Referring to FIG. 7B, the horizontal axis represents the amount of defocus and the vertical axis represents the base line length.

FIG. 7B indicates that the base line length depends on the amount of defocus.

Since the temporary base line length w1 is temporarily calculated on the basis of the light flux 601 on the assumption that the amount of defocus is zero, the amount of temporary defocus calculated in Step S302 is more close to the actual amount of defocus, compared with the amount of defocus that is equal to zero, despite inclusion of the error.

In contrast, since the base line length w2 is calculated in a state in which the light flux is more close to the actual light flux 602 in consideration of the amount of temporary defocus ΔL1 in Step S303, the error is reduced.

In other words, the base line length w2 is calculated with respect to a point more close to the actual focus position, compared with the temporary base line length w1.

Accordingly, it is possible to calculate the more accurate base line length to enable the detection of the distance with higher accuracy in Step S304.

[Other Configurations]

The imaging unit in the distance detecting apparatus of any of the embodiments of the present invention may be composed of the image pickup element.

Specifically, a solid-state image pickup element, such as a Complementary Metal Oxide Semiconductor sensor (CMOS sensor) or a Charge Coupled Device sensor (CCD sensor), may be used as the image pickup element.

An arithmetic processing unit in the distance detecting apparatus according to any of the embodiments of the present invention may be composed of an integrated circuit (IC) in which semiconductor elements are integrated. For example, the arithmetic processing unit may be composed of an IC, a large scale integration (LSI), a system LSI, a micro processing unit (MPU), or a central processing unit (CPU).

The present invention also includes a program, in addition to the distance detecting apparatus.

The program according to an embodiment of the present invention causes a computer in an image pickup apparatus to execute certain processing steps. The image pickup apparatus includes an imaging optical system that forms an image of a subject; an imaging unit that generates a first image signal based on a light flux that has passed through a first pupil area of the imaging optical system and a second image signal based on a light flux that has passed through a second pupil area of the imaging optical system; and the computer for detecting the distance to the subject.

The image pickup apparatus described here is, for example, the digital camera 100 described above with reference to FIG. 1A, which includes the image pickup element 102 serving as the imaging unit, the arithmetic processor 104, and the memory 109.

When the arithmetic processor 104 is composed of, for example, the micro processing unit or the central processing unit, the arithmetic processing unit may be considered as the computer.

The program according to the embodiment of the present invention causes a computer for detecting the distance to a subject by using a first image signal and a second image signal that are generated by an imaging unit to execute certain processing steps. Specifically, the program according to the embodiment of the present invention causes the computer to execute the temporary distance calculation to calculate the amount of temporary defocus on the basis of the first image signal and the second image signal.

The program according to the embodiment of the present invention also causes the computer to execute the conversion factor calculation to calculate the conversion factor with which the amount of image displacement indicating the relative positional displacement between a first image and a second image based on the first image signal and the second image signal, respectively, is converted into the amount of defocus on the basis of the amount of temporary defocus.

The program according to the embodiment of the present invention further causes the computer to execute the distance calculation to calculate the amount of defocus by using the conversion factor.

The program according to the embodiment of the present invention may be installed in a computer of an image pickup apparatus including a certain imaging optical system, a certain imaging unit, and the computer to enable the image pickup apparatus to perform the distance detection with high accuracy.

The program according to the embodiment of the present invention may be distributed via the Internet, in addition to a recording medium.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention may be applied to an arithmetic processing apparatus.

The arithmetic processing apparatus causes an image pickup apparatus to execute arithmetic processing for detecting a certain distance. The image pickup apparatus includes an imaging unit that generates a first image signal based on a light flux that has passed through a first pupil area of an imaging optical system that forms an image of a subject and a second image signal based on a light flux that has passed through a second pupil area of the imaging optical system.

In the detection of the certain distance, the distance to the subject is detected on the basis of the amount of defocus indicating the distance between the imaging plane of the imaging unit and the image forming plane of the light fluxes that have passed through the first pupil area and the second pupil area.

The arithmetic processing apparatus executes the temporary distance calculation to calculate the amount of temporary defocus on the basis of the first image signal and the second image signal.

The arithmetic processing apparatus also executes the conversion factor calculation to calculate the conversion factor with which the amount of image displacement indicating the relative positional displacement between a first image and a second image based on the first image signal and the second image signal, respectively, is converted into the amount of defocus on the basis of the amount of temporary defocus.

The arithmetic processing apparatus further executes the distance calculation to calculate the amount of defocus by using the conversion factor.

Specific embodiments of the present invention will now be described in detail.

First Exemplary Embodiment

A digital camera including the distance detecting apparatus according to the embodiment of the present invention will be described in a first exemplary embodiment.

Figure 8A:
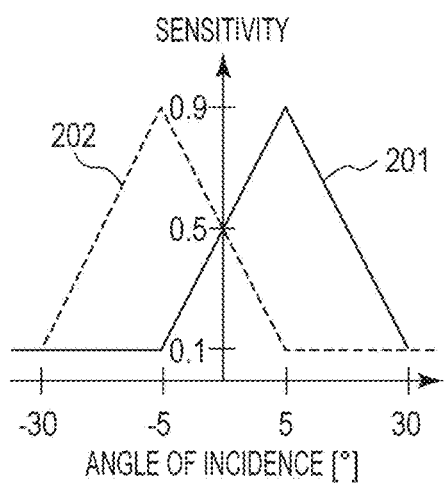
FIG. 8A is a schematic view for describing a first numerical value example, which illustrates the pixel sensitivities of the distance measurement pixels arranged in the image pickup element.

In the first exemplary embodiment, exemplary numerical values in the digital camera 100 including the distance detecting apparatus 110 according to the embodiment of the present invention, illustrated in FIG. 1A, will be indicated. FIG. 8A illustrates the pixel sensitivities of the distance measurement pixels arranged in the image pickup element 102.

Referring to FIG. 8A, the horizontal axis represents the angle (the angle of incidence) between the light beam and the optical axis and the vertical axis represents the pixel sensitivity. The maximum value of the pixel sensitivity is set to one in FIG. 8A.

Figure 8B:
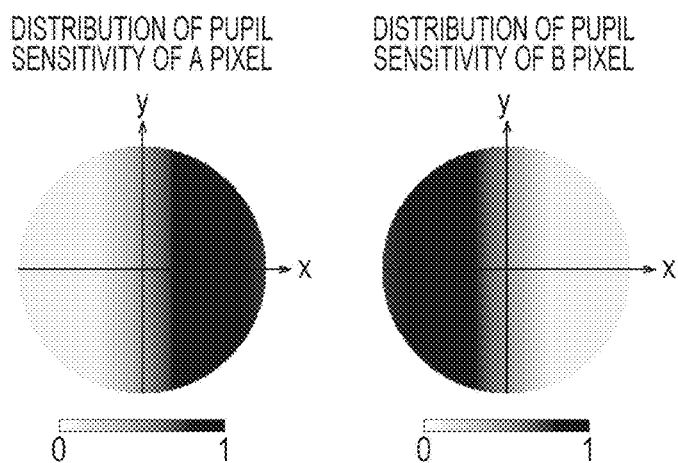
FIG. 8B is a schematic view for describing the first numerical value example, which illustrates the distributions of the pupil sensitivities resulting from projection of the pixel sensitivities of the A pixel and the B pixel on the exit pupil when the focus position of an imaging lens is on the image pickup element.

FIG. 8B illustrates the distributions of the pupil sensitivities resulting from projection of the pixel sensitivities of the A pixel and the B pixel on the exit pupil 106 when the focus position of the imaging lens 101 is on the image pickup element 102.

In this example, the F-number of the imaging lens 101 was set to 2.0, the distance L between the image pickup element 102 and the exit pupil 106 was set to 20 mm, the magnification was set to 50×, and the distance to the subject was set to 5 m.

The amount of defocus at the image side was set to +6 mm in advance.

Figure 8C:
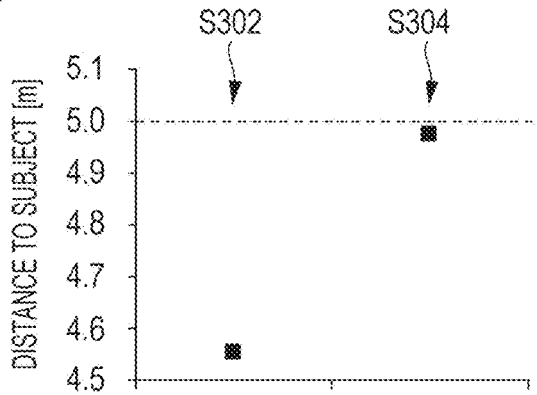
FIG. 8C is a schematic view for describing the first numerical value example, which is a graph indicating the result of calculation of the amount of defocus according to the flowchart in FIG. 3 in the distance detecting apparatus.

FIG. 8C is a graph indicating the result of calculation of the amount of defocus according to the flowchart in FIG. 3 in the distance detecting apparatus 110.

Referring to FIG. 8C, the vertical axis represents the distance to the subject calculated in each step.

The horizontal axis represents Steps S302 and S304 in the flowchart in FIG. 3.

Although the distance to the subject calculated in Step S302 was 4.56 [m] and the distance measurement error was relatively large, the calculation of the conversion factor again in Step S303 resulted in a distance of 4.98 [m] to the subject to allow the distance measurement error to decrease to a low value.

The use of the distance detecting apparatus 110 of the embodiment of the present invention allows the error in the conversion of the amount of image displacement into the distance to the subject to be reduced to calculate the distance to the subject with high accuracy.

Second Exemplary Embodiment

In a second exemplary embodiment, a camera similar to the digital camera 100 described above with reference to FIGS. 1A to 1C will be described.

Figure 10A:
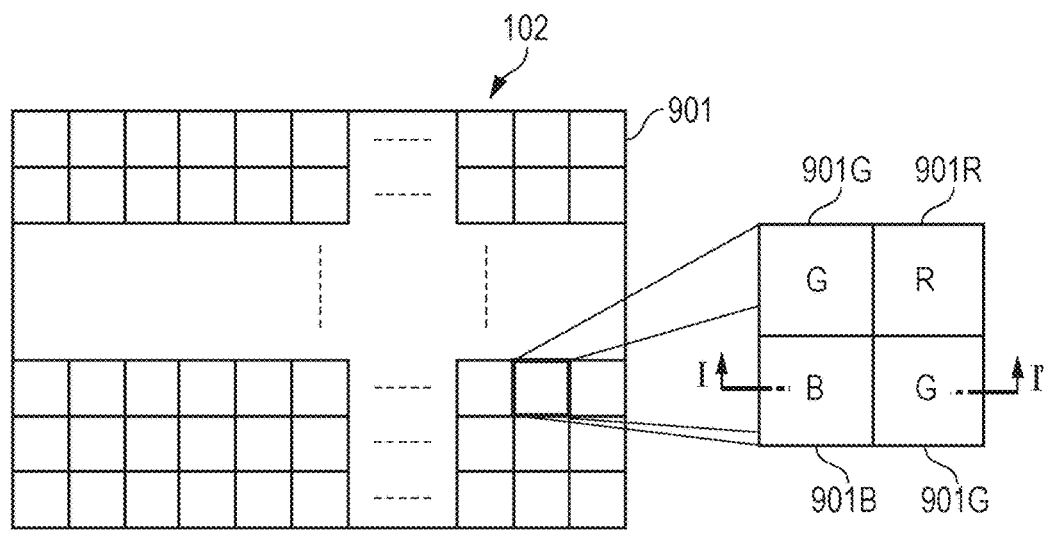
FIG. 10A is a schematic view illustrating an example of an imaging unit (the image pickup element) in an embodiment.
Figure 10B:
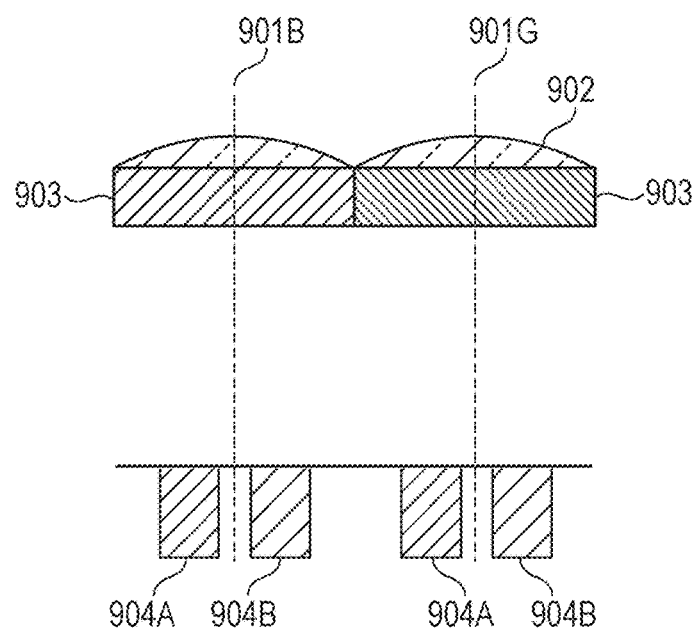
FIG. 10B is a cross-sectional view taken along a line I-I' in FIG. 10A.

FIGS. 10A and 10B illustrate the image pickup element 102 in the distance detecting apparatus 110 of the second exemplary embodiment.

FIG. 10A illustrates a distance measurement pixel 901 in which pixels of two rows and pixels of two columns are arranged. G pixels 901G are diagonally arranged and an R pixel 901R and a B pixel 901B are arranged in the remaining two pixels in the distance measurement pixel 901.

The distance measurement pixel 901 in which pixels of two rows and pixels of two columns are arranged is repeatedly arranged.

FIG. 10B is a cross-sectional view taken along a line I-I' in FIG. 10A.

Referring to FIG. 10B, reference numeral 902 denotes a microlens, reference numeral 903 denotes a color filter, and reference numerals 904A and 904B denote photoelectric converters.

In the image pickup element 102 in the second exemplary embodiment, the two photoelectric converters are arranged in one pixel (901R, 901G, and 901B) and the power of the microlens 902 is set so that the photoelectric converters have an optically conjugate relationship with the exit pupil 106.

This arrangement allows the photoelectric converters 904A and 904B to receive the light fluxes that have passed through different areas of the exit pupil 106. In the distance detecting apparatus 110 of the second exemplary embodiment, the distance measurement pixels are arranged in all the pixels in the image pickup element 102.

The arrangement of the distance measurement pixels illustrated in FIGS. 10A and 10B in all the pixels enables the image formation by using the image signal of the A pixel and the image signal of the B pixel.

In addition, the distance distribution (distance map) corresponding to the images captured by the digital camera 100 is also acquired.

The amount of blur of the subject in an image depends on the amount of defocus (the distance from the focus position at the object side). Performing processing based on the distance distribution to the image that is generated allows appropriate image processing, such as arbitrary blur addition and refocusing after the image is captured, to be performed to the image.

In the second exemplary embodiment, the calculation of the distance to the subject according to the flowchart in FIG. 3 is performed to a partial pixel area of the multiple pixels included in the image pickup element 102.

In the second exemplary embodiment, the pixel area to which the process in FIG. 3 is performed is set to a peripheral area of the image pickup element 102.

The main subject of which a photographer takes a picture is generally arranged in a central area of the image pickup element 102.

In contrast, the background is arranged in the peripheral area of the image pickup element 102.

The amount of defocus in the background is larger than that in the main subject, and the accuracy of the amount of temporary defocus calculated in Step S302 in FIG. 3 is low in the peripheral area of the image pickup element 102.

In the distance detecting unit 103 in the second exemplary embodiment, the distance calculation according to the flowchart in FIG. 3 is performed in the peripheral area while only Steps S301 and S302 in FIG. 3 are performed in the central area.

Performing the above processing in the distance detecting unit 103 allows the reduction in the number of steps necessary for the calculation of the distance distribution (that is, the speed up of the calculation of the distance distribution) to be compatible with the creation of the distance distribution with high accuracy.

Figure 11:
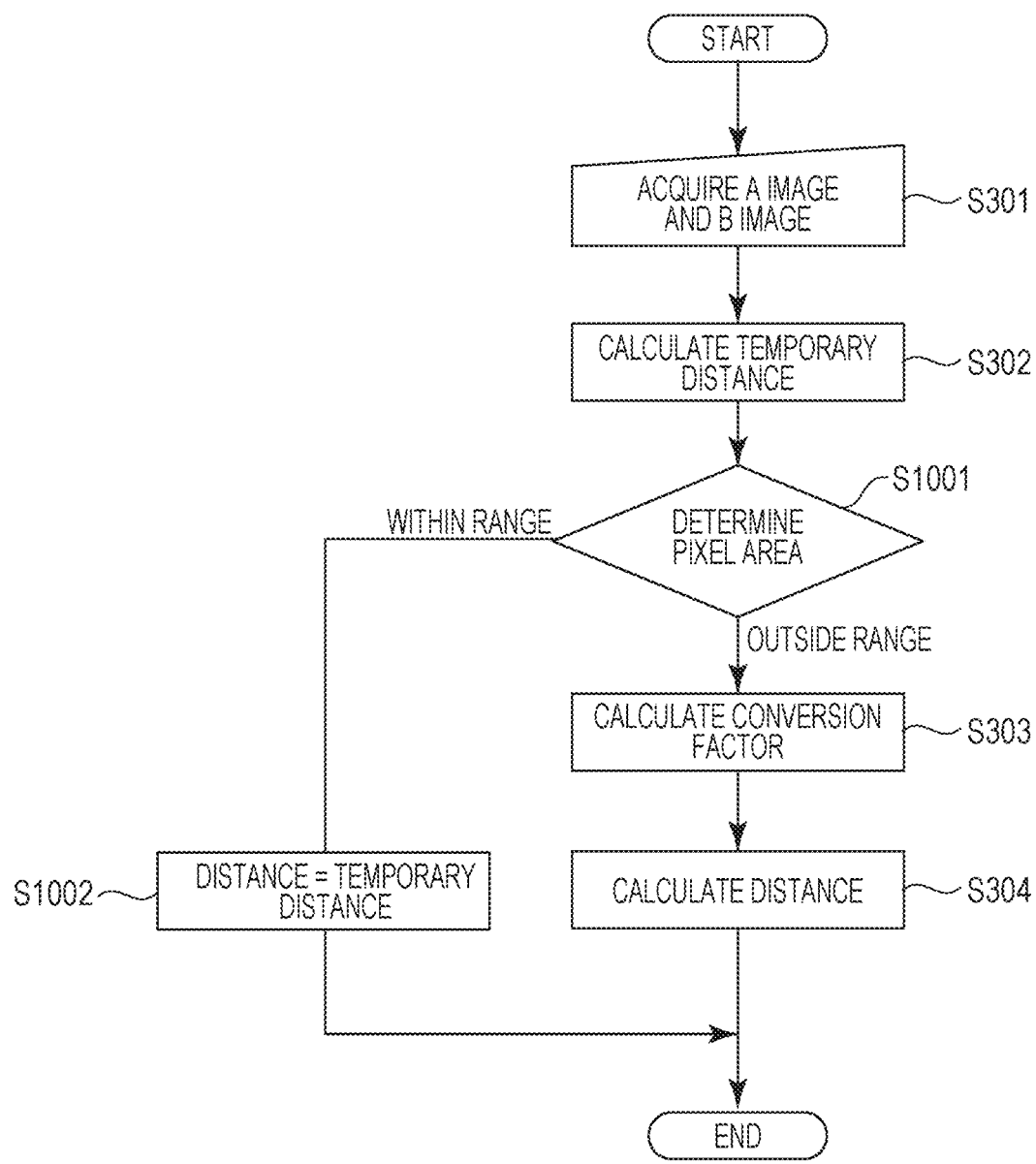
FIG. 11 is a flowchart illustrating another example of the process of calculating the distance to the subject.

Although the pixel area where the process in FIG. 3 is performed is set in advance in the second exemplary embodiment, a process according to a flowchart in FIG. 11 may be performed to the entire pixel area.

Referring to FIG. 11, in pixel area determination in Step S1001, it is determined whether the amount of temporary defocus calculated in Step S302 is outside the range of the amount of temporary defocus that is set in advance (determination of whether the amount of temporary defocus calculated in Step S302 is within the range). If the amount of temporary defocus calculated in Step S302 is outside the range of the amount of temporary defocus that is set in advance, the process goes to Step S303. If the amount of temporary defocus calculated in Step S302 is within the range of the amount of temporary defocus that is set in advance, in Step S1002, the amount of defocus ΔL2 is replaced with the amount of temporary defocus ΔL1.

It is preferred that the range of the amount of temporary defocus be appropriately set in accordance with the accuracy of the distance detection required for the distance detecting apparatus 110.

For example, the range of the amount of temporary defocus may be set so that the distance measurement error caused by the error in the conversion factor calculated from FIG. 7B is lower than or equal to ±σF by using the fact that the depth of field at the image side is equal to ±σF from the F-number of the imaging lens 101 and permissible circle of confusion σ.

Performing the process according to the flowchart in FIG. 11 to the entire pixel area allows the reduction in the number of steps necessary for the calculation of the distance distribution to be compatible with the creation of the distance distribution with high accuracy.

Third Exemplary Embodiment

In a third exemplary embodiment, an example in which the distance is calculated according to a flowchart different from the ones described above will be described.

Figure 12A:
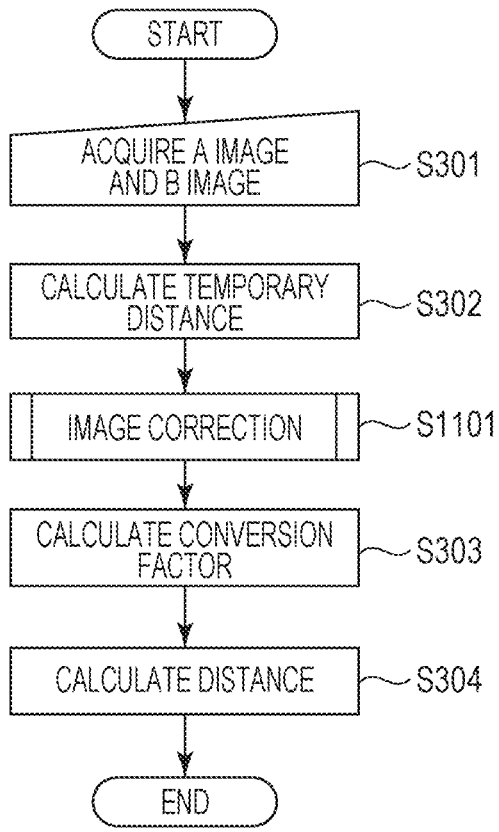
FIG. 12A is a flowchart illustrating another example of the process of calculating the distance to the subject.

The distance detecting unit 103 in the distance detecting apparatus 110 of the third exemplary embodiment calculates the distance to the subject according to a flowchart illustrated in FIG. 12A.

Referring to FIG. 12A, in Step S1101, image correction of the A image and the B image is performed.

Figure 12B:
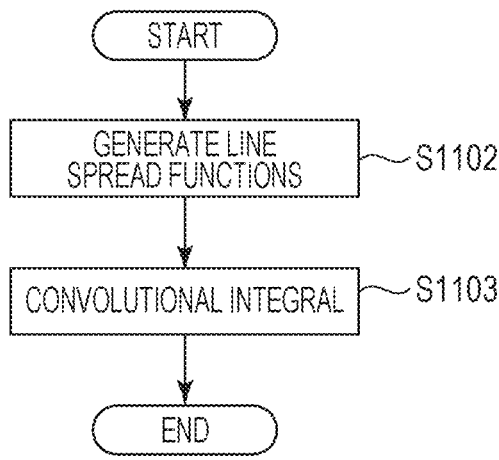
FIG. 12B is a flowchart illustrating the example of the process of calculating the distance to the subject in FIG. 12A in detail.

FIG. 12B illustrates the image correction in Step S1101 in detail.

In line spread function calculation in Step S1102, line spread functions of the A pixel and the B pixel corresponding to the amount of temporary defocus calculated in Step S302 are generated.

In convolutional integral in Step S1103, the A image acquired in Step S301 is subjected to the convolutional integral with the line spread function of the B pixel and the B image acquired in Step S301 is subjected to the convolutional integral with the line spread function of the A pixel to generate an A image (a corrected A image) and a B image (a corrected B image) the shapes of which are corrected.

In Step S304 in FIG. 12A, the amount of image displacement r between the corrected A image (a first corrected image signal) and the corrected B image (a second corrected image signal) is calculated by known correlation calculation (for example, according to Equation (1) to calculate the distance to the subject.

The A image acquired in Step S301 has a shape resulting from the convolutional integral of the line spread function of the A pixel to the subject.

The B image acquired in Step S301 has a shape resulting from the convolutional integral of the line spread function of the B pixel to the subject.

The shape of the line spread function of the A pixel is generally asymmetric to that of the line spread function of the B pixel due to the effect of, for example, the vignetting.

The convolutional integral of the line spread functions having asymmetric shapes makes the A image asymmetric to the B image, which are acquired in Step S301.

When the A image is not symmetric to the B image with respect to the optical axis, the degree of coincidence of the A image with the B image is reduced to reduce the accuracy of detection of the amount of image displacement in the calculation of the amount of image displacement by the correlation calculation.

As a result, the accuracy of detection of the amount of defocus that is calculated is reduced.

In order to improve the accuracy of detection of the amount of image displacement, the asymmetry between the A image and the B image is corrected to improve the degree of coincidence between the images.

In the distance detecting unit 103 in the distance detecting apparatus 110 of the third exemplary embodiment, the image correction in Step S1101 is performed to improve the degree of coincidence between the images.

However, the A image and the B image having a high degree of coincidence are acquired near an in-focus position where the amount of temporary defocus calculated in Step S302 is small.

Accordingly, image correction determination to determine whether the image correction is performed on the basis of the amount of temporary defocus may be performed between Step S302 and Step S1101.

The addition of the image correction determination in the flowchart in FIG. 12A allows the number of steps necessary for the calculation of the distance to the subject near the in-focus position to be reduced to calculate the distance to the subject at high speed and with high accuracy.

Figure 13:
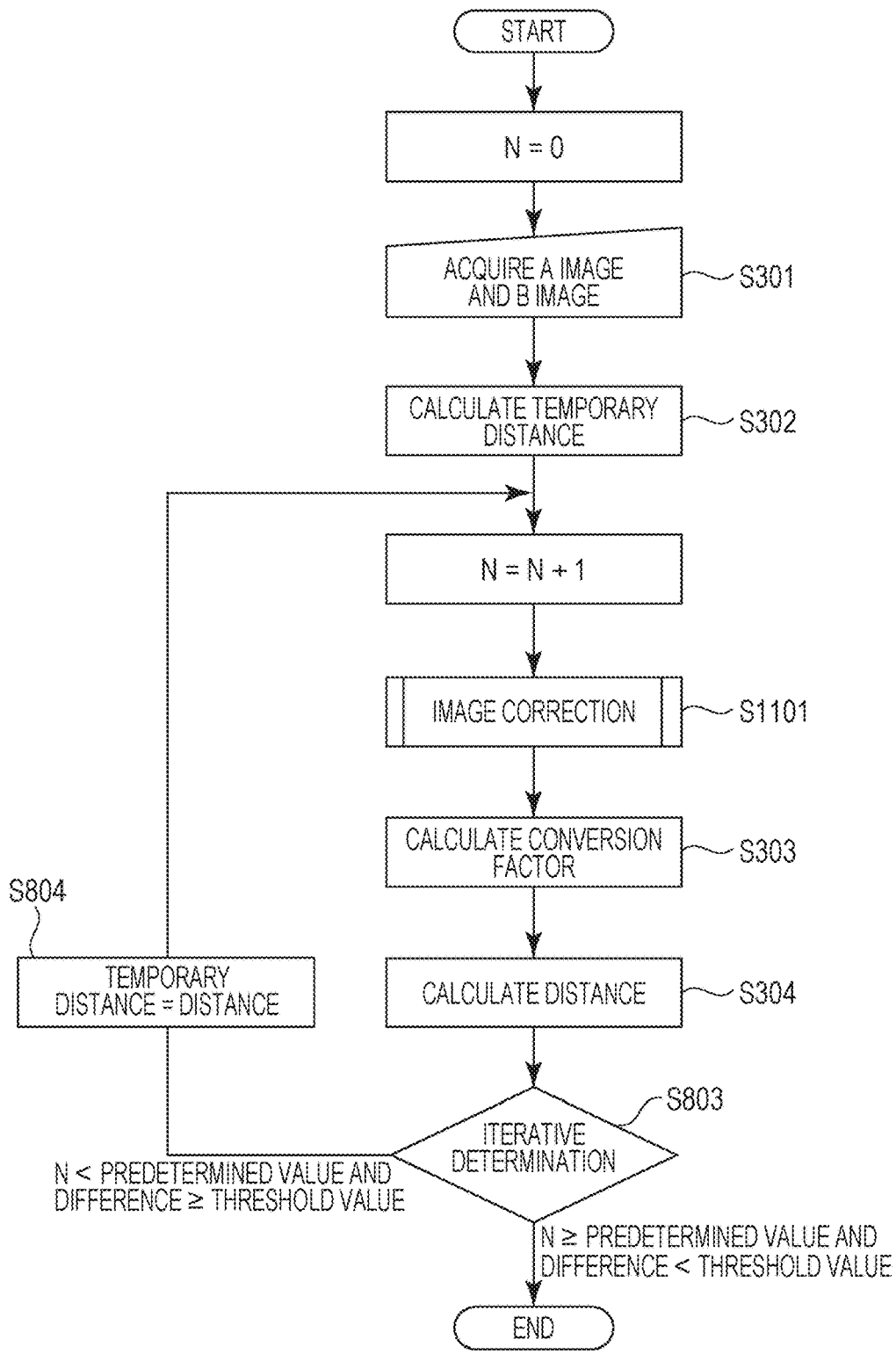
FIG. 13 is a flowchart illustrating another example of the process of calculating the distance to the subject.

Although the distance detecting unit 103 in the distance detecting apparatus 110 of the third exemplary embodiment performs the process according to FIGS. 12A and 12B, iterative determination in Step S803 in a flowchart illustrated in FIG. 13 may be added.

Performing the image correction in Step S1101 and the base line length calculation in Step S303 multiple times as in the process illustrated in FIG. 13 enables the calculation of the distance with higher accuracy in consideration of a converge state of the amount of defocus.

When the distance measurement pixels are arranged in multiple pixels in the image pickup element 102, a process according to a flowchart illustrated in FIG. 14 may be performed.

The addition of the pixel area determination in Step S1001 to determine the partial pixel area of the multiple pixels allows the reduction in the number of steps necessary for the creation of the distance distribution to be compatible with the creation of the distance distribution with high accuracy.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-169757, filed Jul. 31, 2012, which is hereby incorporated by reference herein in its entirety.

REFERENCE SIGNS LIST 100 digital camera
110 distance detecting apparatus
101 imaging lens (imaging optical system)
102 image pickup element (imaging unit)
103 distance detecting unit
104 arithmetic processor (arithmetic processing unit)
105 subject
106 exit pupil
107 first pupil area
108 second pupil area

The invention claimed is:

1. A distance detecting apparatus comprising:
an imaging unit configured to generate first and second image signals based on a light flux passing through first and second pupil areas, respectively, of an imaging optical system that forms an image of a subject; and
an arithmetic processing unit configured to perform operations comprising:
calculating a first conversion factor on the basis of a base line length,
converting the first conversion factor into a first amount of defocus using an image displacement indicating relative positional displacement between first and second images based on the first and second image signals, respectively,
calculating a second conversion factor using the first amount of defocus and distributions of pupil sensitivities from the first and second image signals,
converting the image displacement into a second amount of defocus using the second conversion factor, and
determining a distance to the subject using the second amount of defocus.

2. The distance detecting apparatus according to claim 1, wherein the distance to the subject is detected by using a focus distance of an imaging lens composing the imaging optical system, the position of a principal point of the imaging lens, and the second amount of defocus.

3. The distance detecting apparatus according to claim 1, wherein the first amount of defocus is calculated by using the first conversion factor acquired when an initial amount of defocus is set to zero, a distance between an exit pupil including the first pupil area and the second pupil area and the imaging plane, and the amount of image displacement.

4. The distance detecting apparatus according to claim 1, wherein the first conversion factor is the base line length, which is a length between first and second centroid positions of projections of the sensitivity distributions of first and second pixels, respectively, composed of first and second photoelectric converters that generate the first and second image signals on the first and second pupil areas, respectively.

5. The distance detecting apparatus according to claim 4, wherein the first amount of defocus is calculated by using the base line length, a distance between the exit pupil and the imaging plane, and the image displacement.

6. The distance detecting apparatus according to claim 1, wherein the first conversion factor is a centroid angle formed by first and second centroid positions of sensitivity distributions resulting from projections of the sensitivity distributions of first and second pixels, respectively, composed of first and second photoelectric converters that generate the first and second image signals on the first and second pupil areas, respectively.

7. The distance detecting apparatus according to claim 1, wherein calculating the second conversion factor comprises substituting the first amount of defocus into a function.

8. The distance detecting apparatus according to claim 7, wherein the function is a quadratic function.

9. The distance detecting apparatus according to claim 1, wherein the imaging unit includes a plurality of distance measurement pixels arranged in an array form.

10. The distance detecting apparatus according to claim 9, wherein the arithmetic processing unit perform the operations to a partial pixel area of the plurality of distance measurement pixels.

11. The distance detecting apparatus according to claim 10,
wherein the operations further comprise:
determining the partial pixel area on the basis of the first or second amount of defocus.

12. The distance detecting apparatus according to claim 1, wherein calculating the second conversion factor comprises calculating the second conversion factor using the first amount of defocus, and first and second centroid positions of first and second line spread functions, respectively, corresponding to the first and second pupil areas, respectively.

13. The distance detecting apparatus according to claim 1, wherein the operations further comprises:
generating a first corrected image signal and a second corrected image signal resulting from image correction to correct asymmetry in shape between the first image signal and the second image signal.

14. The distance detecting apparatus according to claim 13,
wherein the operations further comprises:
determining whether the image correction is performed on the basis of the first or second amount of defocus.

15. The distance detecting apparatus according to claim 1, wherein the operations further comprises:
determining whether the second conversion factor and the second amount of defocus are calculated again on the basis of at least one of a converge state of the second amount of defocus and the number of times when the second amount of defocus is calculated.

16. An image pickup apparatus including the distance detecting apparatus according to claim 1.

17. The image pickup apparatus according to claim 16, wherein, in the image pickup apparatus, a distance measurement pixel including a first pixel composed of a first photoelectric converter that composes the imaging unit and that generates the first image signal and a second pixel composed of a second photoelectric converter that composes the imaging unit and that generates the second image signal is arranged on the same face as that of an image acquisition pixel composed of a photoelectric converter that performs imaging to acquire an image of the subject.

18. The image pickup apparatus according to claim 16, wherein the image pickup apparatus is a digital camera.

19. The image pickup apparatus according to claim 16, wherein the image pickup apparatus is a digital video camera.

20. An arithmetic processing apparatus causing an image pickup apparatus including an imaging unit that generates first and second image signals based on a light flux passing through first and second pupil areas, respectively, of an imaging optical system that forms an image of a subject to perform operations to detect a distance to the subject,
wherein the operations comprise:
calculating a first conversion factor on the basis of a base line length,
converting the first conversion factor into a first amount of defocus using an image displacement indicating relative positional displacement between first and second images based on the first and second image signals, respectively,
calculating a second conversion factor using the first amount of defocus and distributions of pupil sensitivities from the first and second image signals,
converting the image displacement into a second amount of defocus using the second conversion factor, and
determining the distance to the subject using the second amount of defocus.

21. A non-transitory computer-readable program causing a computer for detecting a distance to a subject by using first and second image signals that are generated by an imaging optical system that forms an image of the subject and an imaging unit that generates the first and second image signals based on a light flux passing through first and second pupil areas, respectively, of the imaging optical system to perform operations comprising:
calculating a first conversion factor on the basis of a base line length,
converting the first conversion factor into a first amount of defocus using an image displacement indicating relative positional displacement between first and second images based on the first and second image signals, respectively,
calculating a second conversion factor using the first amount of defocus and distributions of pupil sensitivities from the first and second image signals,
converting the image displacement into a second amount of defocus using the second conversion factor, and
determining the distance to the subject using the second amount of defocus.

* * * * *